(12) United States Patent
Setiabudi

(10) Patent No.: US 7,217,771 B2
(45) Date of Patent: May 15, 2007

(54) EPOXY RESIN

(75) Inventor: Frans Setiabudi, Eschbach (DE)

(73) Assignee: Huntsman Advanced Materials Americas Inc., Salt Lake City, UT (US)

( * ) Notice: Subject to any disclaimer, the term of this patent is extended or adjusted under 35 U.S.C. 154(b) by 241 days.

(21) Appl. No.: 10/485,440

(22) PCT Filed: Jul. 29, 2002

(86) PCT No.: PCT/EP02/08412

§ 371 (c)(1),
(2), (4) Date: Jan. 30, 2004

(87) PCT Pub. No.: WO03/011971

PCT Pub. Date: Feb. 13, 2003

(65) Prior Publication Data

US 2004/0234773 A1    Nov. 25, 2004

(30) Foreign Application Priority Data

Jul. 31, 2001    (CH) .................................... 1425/01

(51) Int. Cl.
*C08L 63/02* (2006.01)
*C08L 63/04* (2006.01)

(52) U.S. Cl. ................... 525/532; 525/113; 525/502; 525/531

(58) Field of Classification Search ............... None
See application file for complete search history.

(56) References Cited

U.S. PATENT DOCUMENTS

| | | | |
|---|---|---|---|
| 3,030,247 A | 4/1962 | Schurb et al. ............... 154/43 |
| 3,386,955 A | 6/1968 | Nawakowski et al. | |
| 3,677,978 A | 7/1972 | Dowbenko et al. | |
| 3,678,007 A | 7/1972 | Dowbenko et al. | |
| 4,092,443 A * | 5/1978 | Green ......................... 427/519 |
| 4,283,520 A | 8/1981 | Moser et al. ................. 528/93 |
| 4,436,892 A | 3/1984 | Zondler et al. ............. 528/117 |
| 4,529,821 A | 7/1985 | Stockinger et al. ......... 564/105 |
| 4,550,203 A | 10/1985 | Stockinger et al. ......... 564/105 |
| 4,587,311 A | 5/1986 | Schmid et al. .............. 525/504 |
| 4,608,300 A | 8/1986 | Gruber ........................ 428/285 |
| 4,618,712 A | 10/1986 | Stockinger et al. ......... 564/103 |
| 4,666,954 A | 5/1987 | Forgo et al. ................... 522/83 |
| 4,694,096 A | 9/1987 | Lehmann et al. ........... 558/251 |
| 4,859,761 A | 8/1989 | Flury et al. ................. 528/128 |
| 5,134,175 A * | 7/1992 | Lucey ........................... 522/76 |
| 5,214,098 A * | 5/1993 | Setiabudi et al. ........... 525/109 |

FOREIGN PATENT DOCUMENTS

| | | |
|---|---|---|
| EP | 200678 A | 11/1986 |
| EP | 306 451 A | 3/1989 |
| EP | 351365 | 1/1990 |
| GB | 1192790 | 5/1970 |
| JP | 49-7599 | 2/1974 |
| JP | 01172419 A * | 7/1989 |
| JP | 07224149 A * | 8/1995 |
| JP | 9003158 A | 1/1997 |

OTHER PUBLICATIONS

Derwent accession No. 1985-317536 and CAPLUS accession No. 1986:187725 for East German Patent No. 226,731, Klemm, Aug. 28, 1985, abstracts.*
Chemical abstracts registry No. 929-06-6 for 2-(2-aminoethoxy)ethanol or 2-(2-hydroxyethoxy)ethylamine, 2006.*
Chemical abstracts registry No. 4986-89-4 for pentaerythritol tetraacrylate, 2006.*
Chemical abstracts registry No. 60506-81-2 for dipentaerythritol pentaacrylate, 2006.*

* cited by examiner

*Primary Examiner*—Robert Sellers

(57) ABSTRACT

Compositions containing: (a) a liquid epoxy resin; (b) an aliphatic or cycloaliphatic primary monoamine and/or an aliphatic or cycloaliphatic disecondary diamine; (c) a latent curing agent for the epoxy resin (a) which does not react until temperatures above 70° C. (measured by means of DSC at a heating rate of 10° C./min); (d) a photopolymerizable compound; and (e) a photoinitiator; the ratio of the number of equivalents of epoxy groups to that of photopolymerizable groups being 1:0.01 to 1:0.7, are suitable as impregnating resins.

9 Claims, No Drawings

EPOXY RESIN

The present invention relates to a curable composition containing an epoxy resin and a photopolymerizable compound, and a process for the preparation of prepregs.

It is known that epoxy resin mixtures with two curing agents of different reactivity can be used for preparing prepregs having a long shelf life, the B-stage formation (reaction with the reactive curing agent) being effected at room temperature or temperatures <60° C. The curing of the prepregs (C-stage formation) is effected by reaction with the heat-activatable curing agent (latent curing agent) at temperatures >80° C.

According to U.S. Pat. No. 4,608,300, prepregs which have limited storability but can be completely cured below 120° C. are obtained by impregnating fibre materials with liquid, solvent-free epoxy resin systems containing a mixture of specific aliphatic or cycloaliphatic amines.

U.S. Pat. No. 4,666,954 describes impregnating resins which contain a photopolymerizable compound and a corresponding photopolymerization catalyst in addition to a heat-curable epoxy resin and a latent curing agent. Prepregs which require only short curing times at relatively low temperatures can be prepared from these resins.

In the case of highly reactive resins, the B-stage formation is effected at low temperatures, as a rule between room temperature and 40° C. At these temperatures, the viscosity of the resin mixture is often relatively high, which leads to problems with the impregnation of the fibre material.

It has now been found that specific epoxy resin/acrylate compositions have a high reactivity and a low impregnation viscosity. The prepregs prepared therefrom have a long shelf life at room temperature and can be cured in a short time at 100–130° C.

The present invention relates to a composition containing
(a) a liquid epoxy resin,
(b) an aliphatic or cycloaliphatic primary monoamine and/or an aliphatic or cycloaliphatic disecondary diamine,
(c) a latent curing agent for the epoxy resin (a) which does not react until temperatures above 70° C. (measured by means of DSC at a heating rate of 10° C./min),
(d) a photopolymerizable compound and
(e) a photoinitiator, the ratio of the number of equivalents of epoxy groups to that of photopolymerizable groups being 1:0.01 to 1:0.7.

In principle, all epoxy resins which are customary in epoxy resin technology and are liquid at room temperature can be used as component (a). It is also possible to use a mixture of epoxy resins said mixture being liquid at room temperature. In the context of the present invention, room temperature means a temperature of 20 to 25° C.

Examples of epoxy resins are:

I) Polyglycidyl and poly(β-methylglycidyl) esters, obtainable by reacting a compound having at least two carboxyl groups in the molecule and, respectively, epichlorohydrin and β-methylepichlorohydrin. The reaction is expediently effected in the presence of bases.

Aliphatic polycarboxylic acids can be used as the compound having at least two carboxyl groups in the molecule. Examples of such polycarboxylic acids are oxalic acid, succinic acid, glutaric acid, adipic acid, pimelic acid, suberic acid, azelaic acid or dimerized or trimerized linoleic acid.

However, cycloaliphatic polycarboxylic acids, such as, for example, tetrahydrophthalic acid, 4-methyltetrahydrophthalic acid, hexahydrophthalic acid or 4-methylhexahydrophthalic acid, may also be used.

Furthermore, aromatic polycarboxylic acids, such as, for example, phthalic acid, isophthalic acid or terephthalic acid, may be used.

II) Polyglycidyl or poly(β-methylglycidyl) ethers, obtainable by reacting a compound having at least two free alcoholic hydroxyl groups and/or phenolic hydroxyl groups with epichlorohydrin or β-methylepichlorohydrin under alkaline conditions or in the presence of an acidic catalyst with subsequent treatment with alkali.

The glycidyl ethers of this type are derived, for example, from acyclic alcohols, for example from ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol or sorbitol, and from polyepichlorohydrins.

Further glycidyl ethers of this type are derived from cycloaliphatic alcohols, such as 1,4-cyclohexanedimethanol, bis(4-hydroxycyclohexyl)methane or 2,2-bis(4-hydroxycyclohexyl)propane, or from alcohols which contain aromatic groups and/or further functional groups, such as N,N-bis(2-hydroxyethyl)aniline or p,p'-bis(2-hydroxyethylamino)-diphenylmethane.

The glycidyl ethers may also be based on mononuclear phenols, such as, for example, resorcinol or hydroquinone, or on polynuclear phenols, such as, for example, bis(4-hydroxyphenyl)methane, 4,4'-dihydroxybiphenyl, bis(4-hydroxyphenyl) sulphone, 1,1,2,2-tetrakis (4-hydroxyphenyl) ethane, 2,2-bis(4-hydroxyphenyl)propane or 2,2-bis(3,5-dibromo-4-hydroxyphenyl)propane.

Further suitable hydroxy compounds for the preparation of glycidyl ethers are novolaks, obtainable by condensation of aldehydes, such as formaldehyde, acetaldehyde, chloral or furfuraldehyde, with phenols or bisphenols which are unsubstituted or substituted by chlorine atoms or $C_1$-$C_9$-alkyl groups, such as, for example, phenol, 4-chlorophenol, 2-methylphenol or 4-tert-butylphenol.

III) Poly(N-glycidyl) compounds, obtainable by dehydrochlorination of the reaction products of epichlorohydrin with amines which contain at least two amine hydrogen atoms. These amines are, for example, aniline, n-butylamine, bis (4-aminophenyl)methane, m-xylylenediamine or bis(4-methylaminophenyl)methane.

However, the poly(N-glycidyl) compounds also include triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, which are derived from dithiols, such as, for example, ethane-1,2-dithiol or bis(4-mercaptomethylphenyl) ether.

V) Cycloaliphatic epoxy resins, such as, for example, bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl 3',4'-epoxycyclohexanecarboxylate.

However, it is also possible to use epoxy resins in which the 1,2-epoxy groups are bonded to different hetero atoms or functional groups; these compounds include, for example, the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl) propane.

Bisphenol diglycidyl ether or an epoxy novolak is preferably used as component (a).

Bisphenol A diglycidyl ether or epoxycresol novolaks are particularly preferred.

The primary monoamines and disecondary diamines suitable as component (b) are known and some of them are commercially available.

Suitable primary monoamines are, for example, benzylamine, cyclohexylamine, ethanolamine, 2-ethylhexylamine, 2-butoxyethylamine, n-octylamine, 2-phenylethylamine, 3-isopropoxypropylamine, 3-amino-2,2-dimethylpropan-1-ol, 3-(2-ethylhexyloxy)propylamine or 2-(2-aminoethoxy)ethanol.

Preferred primary monoamines are benzylamine, n-octylamine, 2-phenylethylamine, 3-(2-ethylhexoxy)propylamine and 2-(2-aminoethoxy)ethanol.

Examples of disecondary diamines are piperazine, N,N'-dicyclohexyl-1,6-hexamethylenediamine and N,N'-bis(β-cyanoethyl)-1,6-hexamethylenediamine.

In principle, any compound which is known for this purpose and complies with the definition according to the invention can be used as latent curing agent (c), i.e. any compound which is inert with respect to the epoxy resin below the defined limiting temperature of 70° C. (measured by means of DSC at a heating rate of 10° C./min), but which reacts rapidly with crosslinking of the resin as soon as this limiting temperature is exceeded. The limiting temperature of the latent curing agents used according to the invention is preferably at least 85° C., in particular at least 100° C. Such compounds are well known and also commercially available.

Examples of suitable latent curing agents are dicyandiamide, cyanoguanidines, such as, for example, the compounds described in U.S. Pat. No. 4,859,761 or EP-A 306 451, aromatic amines, such as, for example, 4,4'- or 3,3'-diaminodiphenyl sulphone, or guanidines, such as, for example, 1-o-tolylbiguanide, or modified polyamines, such as, for example, Ancamine® 2014 S (Anchor Chemical UK Limited, Manchester).

Other suitable latent curing agents are N-acylimidazoles, such as, for example, 1-(2',4',6'-trimethylbenzoyl)-2-phenylimidazole or 1-benzoyl-2-isopropylimidazole. Such compounds are described, for example, in U.S. Pat. No. 4,436,892, U.S. Pat. No. 4,587,311 or Japanese Patent 743,212.

Further suitable curing agents are metal salt complexes of imidazoles, as described, for example, in U.S. Pat. No. 3,678,007 or U.S. Pat. No. 3,677,978, carboxylic acid hydrazides, such as, for example, adipic acid dihydrazide, isophthalic acid dihydrazide or anthranilic acid hydrazide, triazine derivatives, such as, for example, 2-phenyl-4,6-diamino-s-triazine (benzoguanamine) or 2-lauryl-4,6-diamino-s-triazine (lauroguanamine), and melamine and its derivatives. The last-mentioned compounds are described, for example, in U.S. Pat. No. 3,030,247.

Other suitable latent curing agents are cyanoacetyl compounds, as described, for example, in U.S. Pat. No. 4,283,520, for example neopentylglycol biscyanoacetate, N-isobutylcyanoacetamide, 1,6-hexamethylene biscyanoacetate or 1,4-cyclohexanedimethanol biscyanoacetate.

Other suitable latent curing agents are N-cyanoacylamide compounds, such as, for example, N,N'-dicyanoadipamide. Such compounds are described, for example, in U.S. Pat. No. 4,529,821, U.S. Pat. No. 4,550,203 and U.S. Pat. No. 4,618,712.

Further suitable latent curing agents are the acylthiopropylphenols described in U.S. Pat. No. 4,694,096 and the urea derivatives disclosed in U.S. Pat. No. 3,386,955, such as, for example, toluene-2,4-bis(N,N-dimethylcarbamide).

Further suitable latent curing agents are also imidazoles, such as, for example, imidazole, 2-ethylimidazole, 2-phenylimidazole, 1-methylimidazole, 1-cyanoethyl-2-ethyl-4-methylimidazole or 2-ethyl-4-methylimidazole.

Further suitable latent curing agents are also tertiary amines, such as benzyldimethylamine or 2,4,6-tris(dimethylaminomethyl)phenol.

Preferred latent curing agents are diaminodiphenyl sulphone, dicyandiamide, phenylimidazole and 2,4,6-tris(dimethylaminomethyl)phenol.

If expedient, the mixtures according to the invention may also contain accelerators for the crosslinking reaction with the latent curing agent. Suitable accelerators are, for example, urea derivatives, such as N,N-dimethyl-N'-(3-chloro-4-methylphenyl)-urea (chlortoluron), N,N-dimethyl-N'-(4-chlorophenyl)urea (monuron) or N,N-dimethyl-N'-(3,4-dichlorophenyl)urea (diuron), 2,4-bis(N',N'-dimethylureido)toluene or 1,4-bis(N',N'-dimethylureido) benzene. The use of these compounds is described, for example, in the abovementioned U.S. Pat. No. 4,283,520. Suitable accelerators are, for example, also the urea derivatives described in GB 1,192,790.

Other suitable accelerators are imidazoles, such as, for example, imidazole, 2-ethylimidazole, 2-phenylimidazole, 1-methylimidazole, 1-cyanoethyl-2-ethyl-4-methylimidazole or 2-ethyl-4-methylimidazole.

Further suitable accelerators are also tertiary amines, their salts or quaternary ammonium compounds, such as benzyldimethylamine, 2,4,6-tris(dimethylaminomethyl)phenol, 4-aminopyridine, tripentylammonium phenolate, tetramethylammonium chloride or benzyltributylammonium bromide or chloride; or alkali metal alcoholates, such as sodium alcoholates of 2,4-dihydroxy-3-hydroxy-methylpentane.

Other suitable accelerators are the solid solutions of a nitrogen base and a phenol/aldehyde resin, as described in EP-A 200678, and the Mannich bases of polymeric phenols, disclosed in EP-A 351365.

Preferred accelerators are imidazoles and urea derivatives.

Suitable photopolymerizable compounds (d) are in particular acrylic acid esters and methacrylic acid esters, for example the compounds mentioned in U.S. Pat. No. 4,666,954. Preferred components (d) are ethylene glycol dimethacrylate, 1,4-butanediol dimethacrylate, 2-hydroxyethyl methacrylate, 2-hydroxypropyl methacrylate, 2-ethoxyethyl methacrylate, 1,1,1-trimethylolpropane trimethacrylate, pentaerythritol tetraacrylate and dipentaerythritol pentacrylate.

In the compositions according to the invention, all types of photoinitiators which form free radicals on appropriate irradiation can be used. Typical known photoinitiators are benzoins, such as benzoin, or benzoin ethers, e.g. benzoin methyl ether, benzoin ethyl ether, benzoin isopropyl ether or benzoin phenyl ether, and benzoin acetate, acetophenones, such as acetophenone, 2,2-dimethoxyacetophenone and 1,1-dichloroacetophenone, benzil, benzil ketals, such as benzil dimethyl ketal and benzil diethyl ketal, anthraquinones, such as 2-methylanthraquinone, 2-ethylanthraquinone, 2-tert-butylanthraquinone, 1-chloroanthraquinone and 2-amylanthraquinone, triphenylphosphine, benzoylphosphine oxides, such as, for example, 2,4,6-trimethylbenzoyldiphenylphosphine oxide (Luzirin® TPO), benzophenones, such as benzophenone and 4,4-bis(N,N'-dimethylamino)benzophenone, xanthones and thioxanthones, acridine derivatives, phenazine derivatives, quinoxaline derivatives, 1-phenyl-1,2-propanedione-2-O-benzoyl oxime, 2-methyl-1-[4-(methylthio) phenyl]-2-morpholinopropan-1-one, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Another class of photoinitiators which is usually employed when argon ion lasers are used are the benzil ketals, such as, for example, benzil dimethyl ketal.

Preferred photoinitiators (e) are isopropylthioxanthone and 2-methyl-1-[4-(methylthio)phenyl]-2-morpholinopropan-1-one.

The photoinitiators are used in effective amounts, i.e. in amounts of about 0.01–10.0% by weight, in particular 0.1–5.0% by weight, based on the total amount of the mixture.

The ratios of the components of the mixtures according to the invention may vary considerably depending on the specific composition. Suitable amounts of the latent curing agent are, for example, in the range of about 3–60, preferably about 6–30, parts by weight per 100 parts by weight of the epoxy resin.

Compositions according to the invention which contain 0.25–0.75, in particular 0.40–0.60, aminehydrogen equivalents of the component (b) per epoxide equivalent of the epoxy resin (a) are preferred.

The component (d) is preferably used in amounts, based on the amount of the component (a), such that the ratio of the number of equivalents of epoxy groups to that of photopolymerizable groups is 1:0.05 to 1:0.5, in particular 1:0.1 to 1:0.4.

The mixtures according to the invention may also be processed from a solution, for example in methyl ethyl ketone, the temperature for the B-stage and the C-stage curing not changing.

If desired, reactive diluents, such as, for example, butanediol diglycidyl ether, monoglycidyl ethers of isomeric higher alcohols, such as, for example, Grilonit V1814® from Ems-Chemie, or butyl glycidyl ether, 2,2,4-trimethylpentylglycidyl ether, phenyl glycidyl ether, cresyl glycidyl ether or glycidyl esters, may be added to the curable mixtures for reducing the viscosity.

The mixtures according to the invention may furthermore contain, as further customary additives, extenders, fillers and reinforcing agents, such as, for example, coal tar, bitumen, textile fibres, glass fibres, boron fibres, carbon fibres, mineral silicates, mica, quartz powder, hydrated aluminium oxide, bentonites, wollastonite, kaolin, silica aerogel or metal powders, e.g. aluminium powder or iron powder, and furthermore pigments and dyes, such as carbon black, oxide dyes and titanium dioxide, flameproofing agents, thixotropic agents, flow control agents, such as silicones, waxes and stearates, some of which are also used as mould release agents, and antioxidants and light stabilizers.

The preparation of the mixtures according to the invention can be carried out in a customary manner by mixing the components with the aid of known mixing units (stirrers, rolls).

The B-stage curing of the compositions according to the invention is generally effected by exposure to light of suitable wavelength at room temperature or slightly elevated temperature. As a rule, an exposure time of less than one minute is sufficient.

However, it is also possible to initiate the B-stage curing thermally when suitable thermal free radical formers are used.

The complete crosslinking with shaping (C-stage curing) is effected preferably at above 80° C., for example at 80–200° C., in particular at about 100–180° C., for about 20–60 minutes.

The crosslinked systems have excellent mechanical and thermal properties, even if complete curing is carried out only after relatively long storage (several weeks to months) of the curable mixtures or of the B-stage.

As mentioned, the mixtures according to the invention are suitable in particular as impregnating resins for the production of fibre composite materials. The invention thus also relates to a process for the preparation of prepregs, characterized in that a reinforcing material is impregnated with a composition according to claim 1 and is exposed to actinic radiation until the material solidifies by photopolymerization of the photopolymerizable compound (d) to give a substantially solid layer.

Preferred reinforcing materials are glass fibres and carbon fibres.

EXAMPLE 1

A. Preparation of the Resin/Curing Agent Mixture

A mixture of 3.03 g of Hycar® ATBN 1300×21 (amine-terminated butadiene/acrylonitrile copolymer; Noveon Inc., USA), 1.86 g of phenylimidazole, 5.57 g of benzylamine, 2.78 g of 1,1'-(4-methyl-m-phenylene)bis(3,3'-dimethylurea), 4.63 g of dicyandiamide and 1.16 g of benzyl alcohol is homogenized under yellow light by means of a three-roll mill and then added to a mixture of 41.58 g of bisphenol A diglycidyl ether (epoxide content 5.45–5.56 eq/kg), 22.39 g of bisphenol A diglycidyl ether (epoxide content 1.9–2.0 eq/kg), 9.86 g of cresol glycidyl ether (epoxide content 5.3–5.7 eq/kg), 6.82 g of dipentaerythrityl pentacrylate, 0.24 g of 2-methyl-1-[4-(methylthio)phenyl]-2-morpholinopropan-1-one and 0.08 g of isopropylthioxanthone.

B. Preparation of the Prepreg

A woven glass fabric is impregnated with the resin mixture on a polypropylene film at room temperature (RT). In order to remove the air and to distribute the binder optimally, a glass rod is rolled over the prepreg; the resin content is 40%. In order to reach the B-stage, the prepreg is exposed on both sides in succession for 10–40 seconds to a 7 300 W metal halogen mercury vapour lamp (1 500–2 000 mJ/cm$^2$). The prepregs thus obtained are slightly tacky.

Flow after storage of the prepreg (1 to 3 days at RT): 17–20%.

The prepregs are then pressed to give a laminate (130° C./5 min).

$T_g$=80° C.

Flexural strength test according to ISO 178/93:

Modulus of elasticity=24 700 MPa

Elongation at break=1.44%

EXAMPLE 2

A. Preparation of the Resin/Curing Agent Mixture

A mixture of 1.64 g of phenylimidazole, 4.92 g of benzylamine, 1 g of 2,4,6-tris(dimethylaminomethyl)phenol, 68.07 g of bisphenol A diglycidyl ether (epoxide content 5.45–5.56 eq/kg), 20 g of cresol glycidyl ether (epoxide content 4.25 eq/kg), 4.1 g of dipentaerythrityl pentacrylate, 0.2 g of 2-methyl-1-[4-(methylthio)phenyl]-2-morpholinopropan-1-one and 0.07 g of isopropylthioxanthone is prepared under yellow light.

B. Preparation of the Prepreg

A woven glass fabric is impregnated with the resin mixture on a polypropylene film at room temperature (RT). In order to remove the air and to distribute the binder optimally, a glass rod is rolled over the prepreg. To reach the B-stage, the prepreg is exposed on both sides in succession for 10–40 seconds to a 7 300 W metal halogen mercury vapour lamp (1 000–2 000 mJ/cm$^2$). The prepregs thus obtained are slightly tacky and have a dry surface after about 2–3 hours at RT. The prepregs are stable for at least 5 days at RT.

The prepregs are then pressed to give a laminate (130° C./5 min).

Flexural strength test according to ISO 178/93:
Modulus of elasticity=29 000 MPa
Elongation at break=3.1%

The invention claimed is:

1. Composition containing
   (a) a liquid epoxy resin,
   (b) an aliphatic or cycloaliphatic primary monoamine and/or an aliphatic or cycloaliphatic disecondary diamine,
   (c) a latent curing agent for the epoxy resin (a) which does not react until temperatures above 70° C. (measured by means of DSC at a heating rate of 10° C./min),
   (d) a photopolymerizable compound and
   (e) a photoinitiator,
   the ratio of the number of equivalents of epoxy groups to that of photopolymerizable groups being 1:0.01 to 1:0.07 and wherein the composition contains 0.25–0.75 aminehydrogen equivalent of the component (b) per epoxide equivalent of the epoxy resin (a).

2. Composition according to claim 1, containing a bisphenol diglycidyl ether or an epoxy novolak as component (a).

3. Composition according to claim 1, containing bisphenol A diglycidyl ether or an epoxycresol novolak as component (a).

4. Composition according to claim 1, containing a primary monoamine as component (b).

5. Composition according to claim 1, containing benzylamine, n-octylamine, 2-phenylethylamine, 3-(2-ethylhexyloxy)propylamine or 2-(2-aminoethoxy)ethanol as component (b).

6. Composition according to claim 1, containing diaminodiphenylsulphone, dicyandiamide, phenylimidazole and 2,4,6-tris(dimethylaminomethyl)phenol as component (c).

7. Composition according to claim 1, containing an acrylic acid ester or a methacrylic acid ester as component (d).

8. Composition according to claim 1, containing ethylene glycol dimethacrylate, 1,4-butanediol dimethacrylate, 2-hydroxyethyl methacrylate, 2-hydroxypropyl methacrylate, 2-ethoxyethyl methacrylate, 1,1,1-trimethylolpropane trimethacrylate, pentaerythritol tetraacrylate or dipentaerythritol pentacrylate as component (d).

9. Composition according to claim 1, containing isopropylthioxanthone or 2-methyl-1-[4-(methylthio) phenyl]-2-morpholinopropan-1-one as component (e).

* * * * *